(12) United States Patent
Yamakawa et al.

(10) Patent No.: US 11,594,756 B2
(45) Date of Patent: Feb. 28, 2023

(54) SINTERED BODY AND METHOD FOR MANUFACTURING THEREOF

(71) Applicant: DENSO CORPORATION, Kariya (JP)

(72) Inventors: Shunsuke Yamakawa, Nagakute (JP); Shingo Ohta, Nagakute (JP); Masaki Watanabe, Toyota (JP); Naohiro Hayashi, Kariya (JP); Keita Takahashi, Kariya (JP)

(73) Assignee: DENSO CORPORATION, Kariya (JP)

(*) Notice: Subject to any disclaimer, the term of this patent is extended or adjusted under 35 U.S.C. 154(b) by 295 days.

(21) Appl. No.: 16/940,417

(22) Filed: Jul. 28, 2020

(65) Prior Publication Data

US 2021/0036361 A1 Feb. 4, 2021

(30) Foreign Application Priority Data

Jul. 30, 2019 (JP) .............................. JP2019-139564

(51) Int. Cl.
| | |
|---|---|
| *H01M 4/02* | (2006.01) |
| *H01M 10/0562* | (2010.01) |
| *C04B 35/488* | (2006.01) |
| *C04B 35/63* | (2006.01) |
| *C04B 35/64* | (2006.01) |
| *C04B 35/626* | (2006.01) |

(52) U.S. Cl.
CPC ..... *H01M 10/0562* (2013.01); *C04B 35/4885* (2013.01); *C04B 35/62675* (2013.01); *C04B 35/6303* (2013.01); *C04B 35/64* (2013.01); *C04B 2235/3217* (2013.01); *C04B 2235/3248* (2013.01); *C04B 2235/3255* (2013.01); *C04B 2235/5436* (2013.01); *C04B 2235/5445* (2013.01); *C04B 2235/656* (2013.01); *C04B 2235/764* (2013.01); *H01M 2300/0077* (2013.01)

(58) Field of Classification Search
CPC ........................................................ H01M 4/02
See application file for complete search history.

(56) References Cited

U.S. PATENT DOCUMENTS

| | | | |
|---|---|---|---|
| 2015/0056519 A1* | 2/2015 | Ohta | .................. H01M 4/5825 264/618 |
| 2017/0346092 A1 | 11/2017 | Yada et al. | |
| 2018/0277890 A1 | 9/2018 | Ueda et al. | |
| 2018/0277908 A1* | 9/2018 | Sasakawa | ......... H01M 10/4257 |

FOREIGN PATENT DOCUMENTS

| | | |
|---|---|---|
| CN | 107437633 A | 12/2017 |
| JP | 2017-188441 A | 10/2017 |

OTHER PUBLICATIONS

Eongyu Yi, Weimin Wang, John Kieffer and Richard M. Laine (2017) "Key parameters governing the densification of cubic-Li7La3Zr2O12 Li+ conductors," Journal of Power Sources, 352, pp. 156-164.

* cited by examiner

*Primary Examiner* — Jacob B Marks
(74) *Attorney, Agent, or Firm* — Harness, Dickey & Pierce, P.L.C.

(57) ABSTRACT

The sintered body has an average particle size in the range of 0.1 μm or more and 5 μm or less, includes garnet-type oxide base material particles having at least Li, La, and Zr, has 8% by volume or more of voids, and has an ionic conductivity of $1.0 \times 10^{-5}$ S/cm or more at temperature of 25° C.

14 Claims, 10 Drawing Sheets

SINTERED BODY AND METHOD FOR MANUFACTURING THEREOF

CROSS REFERENCE TO RELATED APPLICATION

This application claims the benefit of priority from Japanese Patent Application No. 2019-139564 filed on Jul. 30, 2019, and the entire contents of the above application are incorporated herein by reference.

TECHNICAL FIELD

The present disclosure relates to a method for manufacturing a sintered body and a sintered body.

BACKGROUND

Conventionally, solid electrolytes have been proposed that include a Li—La—Zr garnet phase and a $Li_{2+x}C_{1-x}B_xO_3$ phase (0<x<0.8). It is said that this solid electrolyte can suppress a different phase having low ionic conductivity. Also, particles of $La_2Zr_2O_7$ and $Li_2CO_3$ having a particle size of about 100 nm are prepared, and a molded body formed of the particles is sintered at 1130° C. for 18 minutes and then heat-treated at 900° C. for 2 hours to obtain a sintered body having a density of 95% by volume and an average particle diameter of 1 μm, and a conductivity of 1.3 mS/cm.

SUMMARY

The sintered body has an average particle size in the range of 0.1 μm or more and 5 μm or less, includes garnet-type oxide base material particles having at least Li, La, and Zr, has 8% by volume or more of voids, and has an ionic conductivity of $1.0\times10^{-5}$ S/cm or more at temperature of 25° C.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
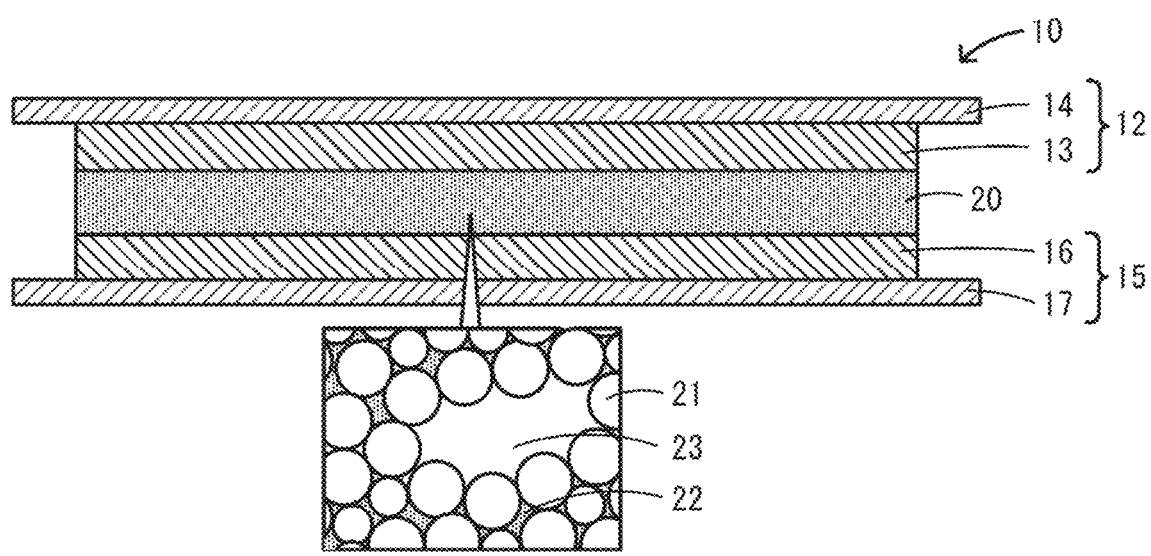
FIG. 1 is an explanatory diagram showing an example of the structure of a lithium battery 10.

In the solid electrolyte for comparison, although the sintering temperature is suppressed to about 700° C., the space between the garnet phases is filled with the sintering aid of $Li_{2+x}C_{1-x}B_xO_3$, and the conductivity of $10^{-7}$ S/cm is low. Moreover, since a process of the solid electrolyte includes a sintering process at a high temperature, it is difficult to maintain a porous structure and the sintered body has a high relative density. As described above, the production of a sintered body having porosity and further suppressing a decrease in conductivity has not been sufficiently considered.

The present disclosure discloses a method for manufacturing a sintered body having porosity and capable of further suppressing a decrease in conductivity, and a sintered body.

As a result of intensive research to achieve an object for providing a method for manufacturing a sintered body having porosity and capable of further suppressing a decrease in conductivity and an object to provide a sintered body, the present inventors find that a precursor powder which is not sintered is manufactured using fine particles made of garnet-type oxide and lithium hydroxide as a sintering aid, and then, the powder is sintered at a low temperature, so that a sintered body having porosity and capable of suppressing a decrease in conductivity is obtained.

The manufacturing method of the sintered body of the present disclosure includes:

a precursor manufacturing step for synthesizing the precursor powder which is not sintered by mixing lithium hydroxide with a base material powder made of a garnet-type oxide having an average particle size in the range of 0.1 μm to 5 μm and including at least Li, La, and Zr to obtain a power, and then, firing the powder; and a molding and sintering step for molding the precursor powder as it is, or adding a pore-forming material to the precursor powder and molding, and sintering the obtained molded body at a temperature of 900° C. or less to obtain a sintered body having a void content of 8% by volume or more.

The sintered body of the present disclosure includes:

a base material particle made of garnet-type oxide having an average particle size in a range between 0.1 μm and 5 μm and including at least Li, La, and Zr; and a void having 8% by volume or more, wherein:

an ionic conductivity at 25° C. is $1.0\times10^{-5}$ S/cm or more.

A method for manufacturing a sintered body and a sintered body according to the present disclosure provide the body having porosity and capable of further suppressing a decrease in conductivity. The reason why such an effect is obtained is presumed as follows. For example, lithium hydroxide added in the step of forming the precursor powder becomes $Li_2O$ at the time of firing, and also becomes $Li_2CO_3$ in the atmosphere at room temperature, which exists between the particles of the garnet-type oxide. Due to the presence of this Li component, neck growth in sintering between particles of the garnet-type oxide is promoted from a low temperature of, for example, 900° C. or less in the sintering step after molding. Thus, it is assumed that both the formation of the dense skeleton structure and the retainment of the fine crystal grains of the garnet-type oxide are obtained. As a result, it is possible to obtain a sintered body having voids and high ionic conductivity.

(Method of Manufacturing Sintered Body)

A method for manufacturing a sintered body according to the present disclosure includes a precursor manufacturing step of synthesizing an unsintered precursor powder, a molding and sintering step of sintering a molded body obtained by molding the precursor powder to obtain a sintered body.

In the precursor manufacturing step, the unsintered precursor powder is synthesized by mixing lithium hydroxide with a base material powder made of a garnet-type oxide having an average particle size in the range of 0.1 μm to 5 μm and including at least Li, La, and Zr to obtain a power, and then, sintering the powder. In this step, a raw material synthesizing process for synthesizing the garnet-type oxide base material powder, a pulverizing process for making the base material powder into fine particles, a mixing process for mixing the base material powder and lithium hydroxide, and a precursor sintering process of sintering the mixed powder may be included. In this step, the base material powder having the basic composition of $Li_{7.0+x-y}(La_{3-x}A_x)(Zr_{2-y}T_y)O_{12}$ is used (where A is at least one of Sr and Ca, T is at least one of Nb and Ta, and $0 < x \leq 1.0$ and $0 < y < 0.75$ are satisfied). By adding the element A or the element T, the ionic conductivity can be made more suitable. The element A is preferably Ca, and the element T is preferably Nb. Alternatively, the base material may be a garnet type oxide having a basic composition of $(Li_{7-3z+x-y}M_z)(La_{3-x}A_x)(Zr_{2-y}T_y)O_{12}$ or $(Li_{7-3z+x-y}M_z)(La_{3-x}A_x)(Y_{2-y}T_y)O_{12}$. Here, in the formula, the element M is at least one of Al and Ga, the element A is at least one of Ca and Sr, the element T is at least one of Nb and Ta, and $0 \leq z \leq 0.2$, $0 \leq x \leq 0.2$ and $0 \leq y \leq 2$. In this basic composition formula, it is more preferable that $0.05 \leq z \leq 0.1$ is satisfied. In this basic composition formula, it is more preferable to satisfy $0.05 \leq x \leq 0.1$. Further, in this basic composition formula, it is more preferable to satisfy $0.1 \leq y \leq 0.8$.

In the raw material synthesis treatment, for example, a raw material including at least a Li compound, a La compound, and a Zr compound may be used for sintering to obtain a base material powder. The raw material is prepared by appropriately blending and adjusting the amount of each compound so as to have a desired composition. Each compound may be, for example, a hydroxide, a carbonate or an oxide. The raw material may include an additive compound including at least one of Al and Ga, an additive compound including at least one of Ca and Sr, an additive compound including at least one of Nb and Ta, and the like. These additive compounds may also be hydroxides, carbonates, oxides and the like. The firing process for synthesizing the raw material may be performed at a temperature of 700° C. or higher and 900° C. or lower, for example.

In the pulverization process, for example, wet or dry type ball mill pulverization, planet mill pulverization, or attrition mill pulverization is performed on the base material having the average particle diameter within the range of 0.1 μm or more and 5 μm or less. A wet ball mill grinding is suitable for the pulverization process. In the wet grinding, water or an organic solvent may be used as a solvent. Examples of the organic solvent may be alcohol and acetone, and alcohol such as ethanol may be preferable. The average particle diameter is the average value of the particle diameters in an observation field of view in which the powder is observed with a scanning electron microscope (SEM) and the length of one side of the view is 10 times larger than the particle diameter (for example, 5 μm×5 μm). It is estimated that five test lines are drawn in the observation view field, the length of the section where each of the test lines crosses the particles is defined as the particle size, and the volume-weighted average particle size is calculated by assuming the particles to be spheres. The average particle size of the base material powder obtained by the pulverization treatment may be preferably 4.0 μm or less, more preferably 2.0 μm or less, and may be 1.0 μm or less. The average particle size of the base material powder may be 0.2 μm or more, and may be 0.5 μm or more.

In the mixing process, the base material powder and lithium hydroxide are mixed. Examples of the mixing method may be wet or dry type ball mill mixing method and mortar mixing method. This mixing treatment may be performed under the same method and conditions as the pulverizing treatment, or may be performed together with the pulverizing treatment, that is, a part of the pulverizing treatment may be in the mixing treatment. The blending amount of lithium hydroxide may be preferably such that the ratio Lh/Lg of the lithium number Lh of lithium hydroxide with respect to the lithium number Lg of garnet-type oxide may be 0.05 or more and 0.35 or less. When the ratio of Lh/Lg is disposed within this range, the neck growth between base material particles during sintering, which will be described later, can be promoted, and the ionic conductivity can be further increased. The blending amount of the ratio Lh/Lg may be more preferably 0.1 or more, further preferably 0.15 or more, and may be 0.2 or more. When the blending amount of lithium hydroxide is increased, the sinterability is further improved, which is preferable. Further, the blending amount of the ratio Lh/Lg may be more preferably less than 0.3, further preferably 0.25 or less. When the ratio of Lh/Lg is less than 0.3, the promotion of sintering may be suppressed, and coarsening of the base material particles may be further suppressed.

In the precursor firing process, the mixed powder thus mixed is fired at a predetermined temperature lower than the sintering temperature. The firing temperature may be, for example, a temperature range of 650° C. or higher and 800° C. or lower. This temperature may be more preferably 700° C. or higher and 750° C. or lower. By firing in this way, a precursor powder is obtained. By firing this precursor powder, $Li_2$, which is a decomposition product of lithium hydroxide, $Li_2CO_3$ absorbing carbon dioxide in the air, and the like are present on the surface of the base material powder. In the precursor powder having such a component on the surface, the bonding of the base material particles is promoted at the time of sintering and, at the same time, the body is made porous.

In the molding and sintering step, the precursor powder is molded as it is, or a pore-forming material is added to the precursor powder and then molded, and the obtained molded body is sintered at a temperature of 900° C. or less to obtain a sintered body having a void content of 8% by volume or more. This molding and sintering step includes a molding process for forming a molded body and a sintering process for sintering the molded body. The step may further include an additive process for adding the pore-forming material and/or the sintering aid into the precursor powder before the molding process.

The additive treatment is to add a pore-forming material and a sintering aid, which are made of any kind of components, and may be an optional treatment. This additive treatment may be performed in an inert gas atmosphere such as nitrogen gas or a noble gas. Examples of the pore-forming material added to the precursor powder include organic substances, and particulate polymers. The polymer may not be particularly limited as long as the polymer is burnt out during sintering, and examples thereof include acrylic particles and organic fibers. The addition amount of the pore-forming material may be appropriately set according to the desired void amount. For example, the addition amount may be 10% by volume or more, 20% by volume or more, or 50% by volume or less or 40% by volume or less. It should be noted that even when only the precursor powder is used without adding the pore-forming material, it can be realized as long as the volume fraction of voids is in the range of 8% by volume or more and 15% by volume or less. The obtained sintered body has the ionic conductivity of $1.0 \times 10^{-4}$ S/cm or more at 25° C. when the pore-forming material is added to the precursor powder, and then, molded and sintered so that the voids are in the range of 10% by volume or more and 50% by volume or less. When the obtained sintered body has the ionic conductivity of $1.0 \times 10^{-5}$ S/cm or more at 25° C. when the pore-forming material is not added to the precursor powder, and then, the powder is molded and sintered so that the voids are in the range of 20% by volume or less. Examples of the sintering aid added to the precursor powder include lithium borate, aluminum oxide, gallium oxide and the like. Examples of lithium borate include $Li_3BO_3$, $Li_2B_4O_7$, and $LiBO_2$, and among these, $Li_3BO_3$ (hereinafter, also referred to as LBO) may be more preferable. The LBO may be preferred because the LBO has lower reactivity with the base material. The addition amount of lithium borate may preferably have the volume fraction of lithium borate with respect to the volume obtained by adding the base material powder and the lithium borate in the range of 5% by volume or more and 15% by volume or less, and more preferably in the range of 8% by volume or more and 12% by volume. Further, the sintering aids of Al and Ga may be included in the Li site of the garnet-type oxide with Li. Aluminum oxide may be preferably added in a range of 0.08 mol or more and 0.12 mol or less with respect to 1 mol of the garnet-type oxide. When the addition amount of aluminum oxide may be 0.08 mol or more, the sintering promoting effect can be exhibited, and when the addition amount is 0.12 mol or less, the added Al can replace the Li site.

In the molding process, a raw material powder including a precursor powder may be molded using a mold. The amount of pressure applied during molding may be appropriately set according to the shape and size of the molded body, and may be, for example, in the range of 1 MPa or more and 100 MPa or less, or in the range of 5 MPa or more and 20 MPa or less. The shape of the molded body may be not particularly limited and may be any shape.

In the sintering process, the molded body is sintered at a temperature of 800° C. or higher and 900° C. or lower. By sintering the molded body in this temperature range, it is possible to obtain a sintered body having voids and further suppressing the decrease in ionic conductivity. Further, in this temperature range, since the temperature is relatively low, it is further suppressed that Li of the base material is volatilized and reduced. The sintering temperature may be 820° C. or higher or 835° C. or higher, or 880° C. or lower or 850° C. or lower. The sintering time may be not particularly limited as long as a sintered body having a desired strength can be obtained. Alternatively, the time may be, for example, 10 hours or more, or 20 hours or more. It may be 50 hours or less, or 24 hours or less. A shorter sintering time may be preferable from the viewpoint of energy saving and porosity, and a longer sintering time may be preferable from the viewpoint of improvement of sintering strength and ionic conductivity. This sintering treatment may be preferably performed in the atmosphere because the body is an oxide sintered body. In this way, a sintered body having voids and having a higher ionic conductivity can be produced.

(Sintered Body)

The sintered body of the present disclosure is manufactured by the above-described method for manufacturing a sintered body. The sintered body has an average particle size in the range of 0.1 μm or more and 5 μm or less, includes garnet-type oxide base material particles having at least Li, La, and Zr, has 8% by volume or more of voids, and has an ionic conductivity of $1.0 \times 10^{-5}$ S/cm or more at temperature of 25° C. The base material particles have a basic composition of $Li_{7.0+x-y}(La_{3-x},A_x)(Zr_{2-y},T_y)O_{12}$. Here, A is at least one of Sr and Ca, T is at least one of Nb and Ta, and $0 < x \leq 1.0$ and $0 < y < 0.75$ are satisfied. Alternatively, the base material particle may be a garnet type oxide having a basic composition of $(Li_{7-3z+x-y}M)(La_{3-x}A_x)(Zr_{2-y}T_y)O_{12}$ or $(Li_{7-3z+x-y}M_z)(La_{3-x}A_x)(Y_{2-y}T_y)O_{12}$. Here, in the formula, the element M is at least one of Al and Ga, the element A is at least one of Ca and Sr, the element T is at least one of Nb and Ta, and $0 \leq z \leq 0.2$, $0 \leq x \leq 0.2$ and $0 \leq y \leq 2$ are satisfied. In this basic composition formula, it is more preferable that $0.05 \leq z \leq 0.1$ is satisfied. In this basic composition formula, it is more preferable to satisfy $0.05 \leq x \leq 0.1$. Further, in this basic composition formula, it is more preferable to satisfy $0.1 \leq y \leq 0.8$.

In this sintered body, lithium borate may be included in the grain boundaries of the base material particles. Lithium borate may further accelerate the sintering of the sintered body. The sintered body may have voids in the range of 10% by volume or more and 50% by volume or less. When the sintered body has more voids, for example, when it is used in a lithium secondary battery as a solid electrolyte or a separator, the body may accommodate precipitated lithium. This void may be 10% by volume or more or 20% by volume or more, and may be 50% by volume or less or 40% by volume or less. The sintered body may have voids in a range of 20% by volume or less and have an ionic conductivity at 25° C. of $1.0 \times 10^{-4}$ S/cm or more. The ionic conductivity of the sintered body may be preferably higher, and the conductivity at 25° C. may be preferably $1.0 \times 10^{-4}$ (S/cm) or more, and $2.5 \times 10^{-4}$ S/cm or more. This conductivity may be $1.0 \times 10^{-2}$ S/cm or less. In the garnet type oxide including Li, La and Zr, the electric conductivity represents ionic conductivity. Since this sintered body has, for example, ionic conductivity, it can be used, for example, as a solid electrolyte or a separator of an electricity storage device such as alithium secondary battery.

FIG. 1 is an explanatory diagram showing an example of the structure of the electricity storage device 10. This electricity storage device 10 has a positive electrode 12, a negative electrode 15, and a solid electrolyte layer 20. The positive electrode 12 has a positive electrode active material layer 13 and a current collector 14. The negative electrode 15 has a negative electrode active material layer 16 and a current collector 17. The solid electrolyte layer 20 is made of the above-described sintered body, and includes base material particles 21 made of a garnet-type oxide including at least Li, La, and Zr, and grain boundaries 22 including components such as a sintering aid, and further has a void 23.

A method for manufacturing a sintered body and a sintered body according to the above description provide the body having porosity and capable of further suppressing a decrease in conductivity. The reason why such an effect is obtained is presumed as follows. For example, lithium hydroxide added in the step of forming the precursor powder becomes $Li_2O$ at the time of firing, and also becomes $Li_2CO_3$ in the atmosphere at room temperature, which exists between the particles of the garnet-type oxide. Due to the presence of this Li component, neck growth in sintering between particles of the garnet-type oxide is promoted from a low temperature of, for example, 900° C. or less in the sintering step after molding. Thus, it is assumed that both the formation of the dense skeleton structure and the retainment of the fine crystal grains of the garnet-type oxide are obtained. As a result, it is possible to obtain a sintered body having voids and high ionic conductivity. Here, when developing a high-capacity and non-flammable oxide all-solid-state battery, it is essential to reduce the thickness of the solid electrolyte. Although it is necessary to secure short-circuit resistance even with a thin film, lithium metal may be deposited on the negative electrode. To solve this difficulty, for example, a part of the solid electrolyte may be made porous and the deposited lithium may be accommodated therein, so that the above difficulty may be resolved. In the present disclosure, the garnet-type oxide providing a skeletal structure has a dense structure with few defects, ensures strength, and has voids to accommodate precipitated lithium, and further, improves short-circuit resistance.

It is needless to say that the present disclosure is not limited to the above-described embodiments and can be implemented in various modes as long as they are within the technical scope of the present disclosure.

EXAMPLE

Hereinafter, an example in which the sintered body of the present disclosure is specifically manufactured will be described as an experimental example.

Experimental example 1 corresponds to a comparative example, and experimental examples 2 to 7 correspond to examples of the present disclosure.

First, a powder synthesizing step and a firing step without a pore-forming material are performed to examine conditions under which the fine-grain structure of Li—La—Zr garnet-type oxide (i.e., LLZ) is maintained, and then, it is considered whether the pore-forming material is added to obtain a sintered body having a desired porous structure.

[Preparation of Fine LLZ-CaNb Powder]

LiOH (manufactured by ALDRICH), $La(OH)_3$, $Ca(OH)_2$, $ZrO_2$, $Nb_2O_5$ (all manufactured by Kojundo Chemical Laboratory Co., Ltd.) are used as powder reagents, and these are weighed to set the base material composition of $Li_{6.8}(La_{2.9}Ca_{0.05})(Zr_{1.75}Nb_{0.25})O_{12}$, and then, these reagents are pulverized with a wet ball mill, mixed, and dried. The wet ball mill process is carried out using an 80 mL zirconia pot and a 1 mmf zirconia ball, using ethanol as a solvent, and rotating at 700 rpm for 1 hour. The drying step is performed at 80° C. After that, calcination is performed in the air to obtain LLZ-CaNb powder that is a garnet-type oxide as a base material powder. The calcination is performed at 700° C. for 48 hours using an alumina crucible. LiOH is additionally added to this LLZ-CaNb powder, a similar mixing and pulverization step is performed, and then a second preliminary calcination process is performed under the condition of 700° C. for 10 hours, and thus, the obtained fine powder is prepared as an unsintered precursor powder (LLZ-CaNb—LiOH powder). The addition amount of LiOH is set such that the ratio Lh/Lg of the lithium number Lh of LiOH to the lithium number Lg of LLZ-CaNb is 0.1 or more and 0.4 or less.

[Evaluation of Precursor Powder]

Figure 2A:
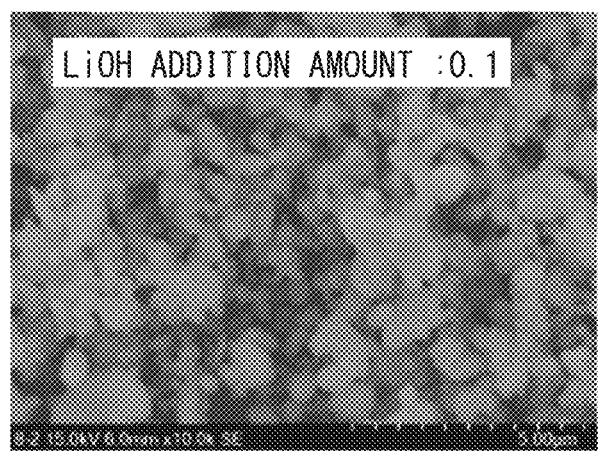
FIGS. 2A and 2B are SEM photographs of the precursor powder.
Figure 2B:
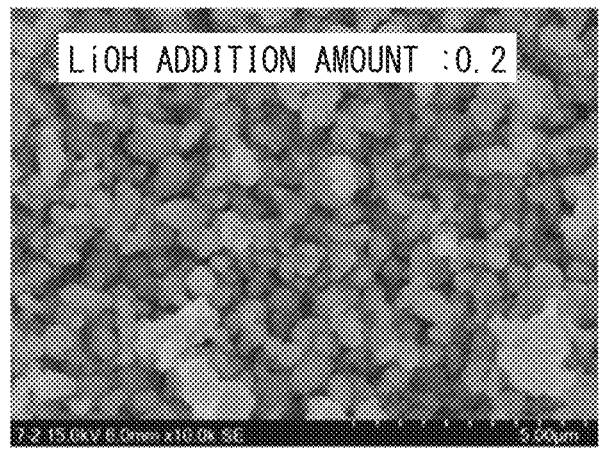
Figure 3:
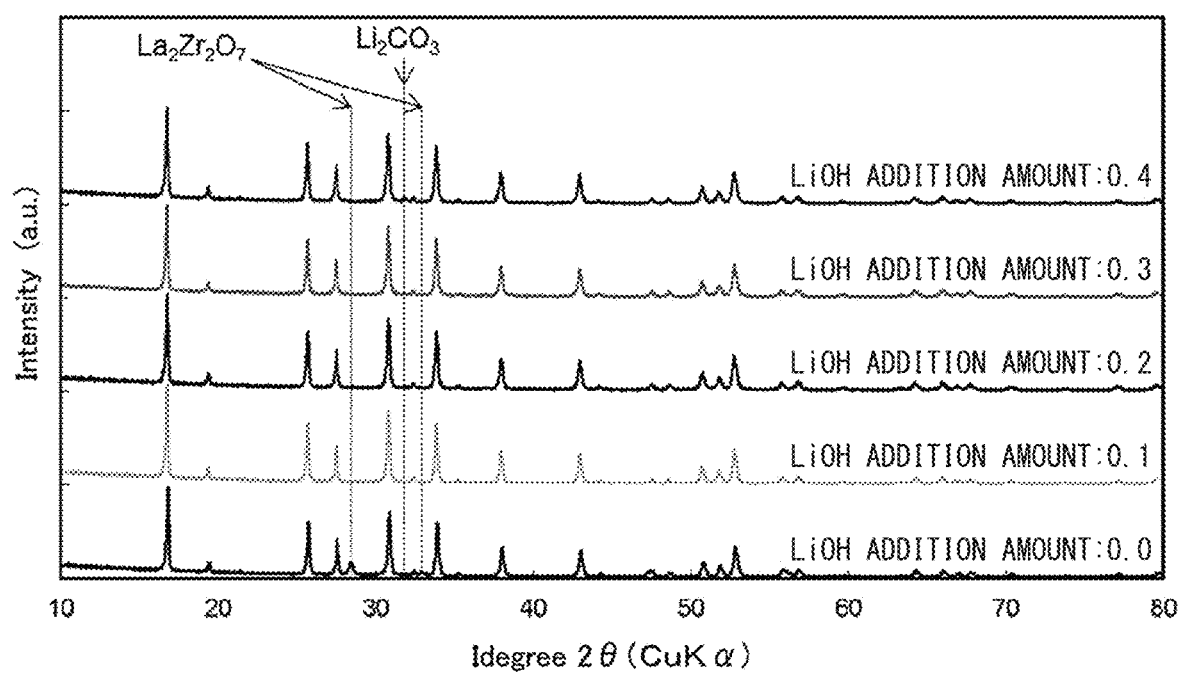
FIG. 3 is a result of X-ray diffraction measurement of a precursor powder.

The obtained powder is observed with a scanning electron microscope (SEM). FIGS. 2A and 2B are SEM photographs of LLZ-CaNb fine powder. FIG. 2A shows a precursor powder with the ratio Lh/Lg of 0.1, and FIG. 2B shows a precursor powder with the ratio Lh/Lg of 0.2. As shown in FIGS. 2A and 2B, the average particle size is 0.5 μm (in FIG. 2A) and 0.5 μm (in FIG. 2B), and it is confirmed that the submicron-sized fine powder is obtained without depending on the ratio Lh/Lg. Moreover, the X-ray diffraction measurement of the precursor powder which has the ratio Lh/Lg of 0, 0.1, 0.2, 0.3, and 0.4, respectively. The X-ray diffraction measurement is performed using a XRD apparatus "smart-Lab" manufactured by Rigaku Corporation with a Cu tube in the range of 2θ=10 degrees to 80 degrees at a rate of 5/min. FIG. 3 is a result of X-ray diffraction measurement of a precursor powder. As shown in FIG. 3, in addition to the peak from the garnet structure (i.e., the cubic crystal) as the main phase, it is confirmed that the $L_2CO_3$ peak clearly appears as the addition amount of LOH increases. It is considered that LOH becomes $Li_2O$ when the precursor powder is fired, and carbon dioxide in the atmosphere is absorbed to form it. Further, when the addition amount of LiOH is "0", a peak attributed to $La_2Zr_2O_7$ is observed, and the addition amount of LiOH may be determined to be the ratio of Lh/Lg preferably 0.05 or more, and more preferably 0.1 or more.

Examination of LiOH Addition Amount in Sintered Body: Experimental Examples 1 to 6

Figure 4:
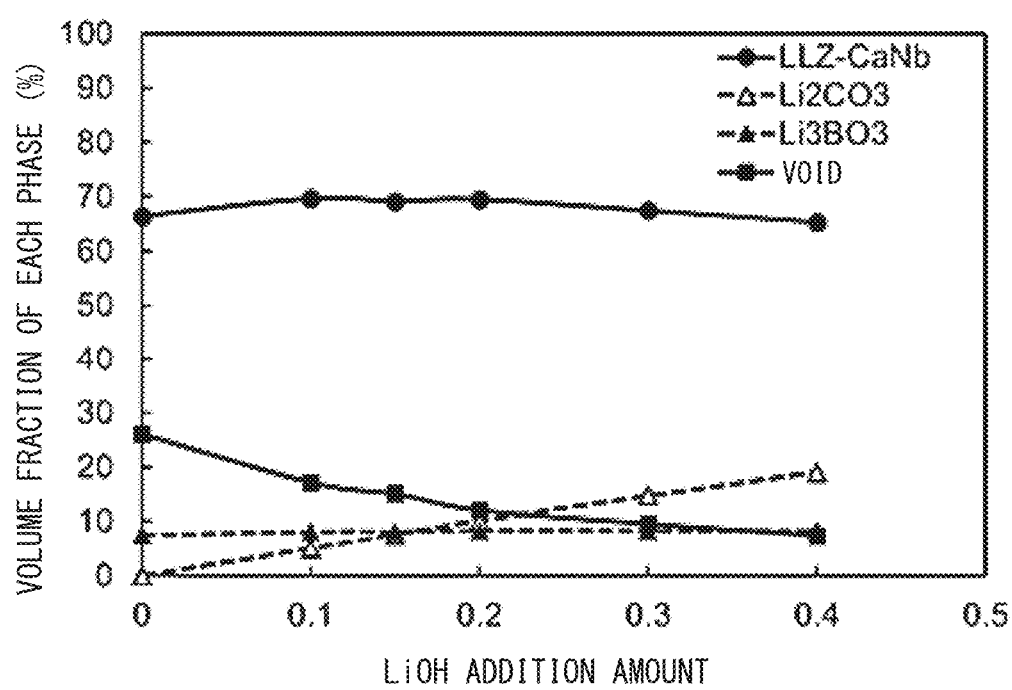
FIG. 4 is a relationship diagram between the additive amount of LiOH and the volume fraction of each phase included in a sintered body.

As described above, it is considered that LiOH added to the base material is disposed as lithium carbonate ($Li_2CO_3$) in the air after the precursor is fired. It is considered that the lithium carbonate exists in the form of adhering as a fine powder on the surface of the base material powder. This lithium carbonate releases $CO_2$ at the sintering temperature of the molded body and changes to $Li_2O$. Therefore, the presence of this $Li_2O$ promotes the neck growth between particles of the LLZ-CaNb as the matrix powder. Here, a sintered body is manufactured using the precursor powder in which the addition amount of LiOH is varied, and its characteristics are evaluated. A raw material powder, which is prepared by adding $Li_3BO_3$ (i.e., LBO) as a sintering aid and γ-$Al_2O_3$ to the base material powder, is molded into a pellet, and thus, a sintered body is obtained. Regarding the mixing ratio of the raw materials, the addition amount of γ-$Al_2O_3$ is 0.1 mol with respect to 1 mol of the base material powder, and the volume fraction of LBO with respect to the total volume of the base material powder and LBO is 10% by volume. The pellet is sintered at 835° C. for 48 hours. The addition amount of LiOH to the precursor powder is set to have the ration of Lh/Lg of 0, 0.1, 0.15, 0.2, 0.3, and 0.4 to obtain the sintered bodies of Experimental Examples 1 to 6, respectively. FIG. 4 is a relationship diagram between the additive amount of LiOH and the volume fraction of each phase included in a sintered body. The volume fraction of each phase is obtained from the apparent density of the sintered body and the preparation composition at the time of producing the sintered body. As shown in FIG. 4, the volume fraction of voids decreases as the addition amount of LiOH increases, that is, the $Li_2CO_3$ increases. As shown in FIG. 4, it is confirmed that the addition of LiOH is successful in reducing the void amount (i.e., the defect amount) in the sintered body.

Figure 5A:
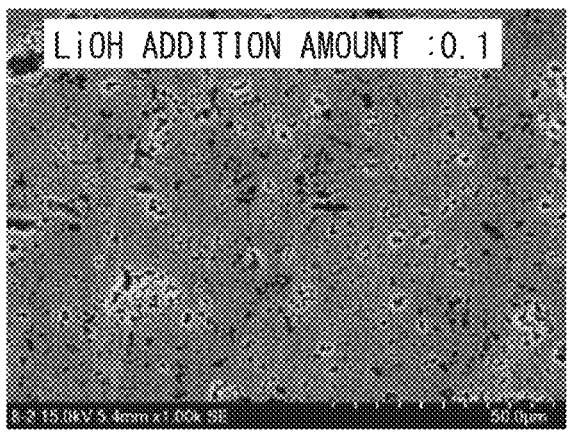
FIGS. 5A to 5E are SEM photographs of a sintered body obtained by sintering a precursor powder.
Figure 5B:
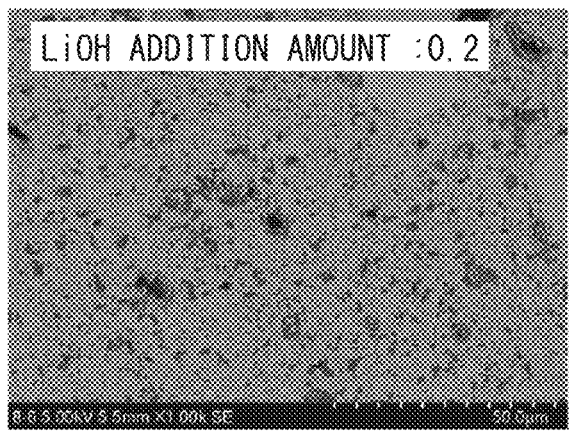
Figure 5C:
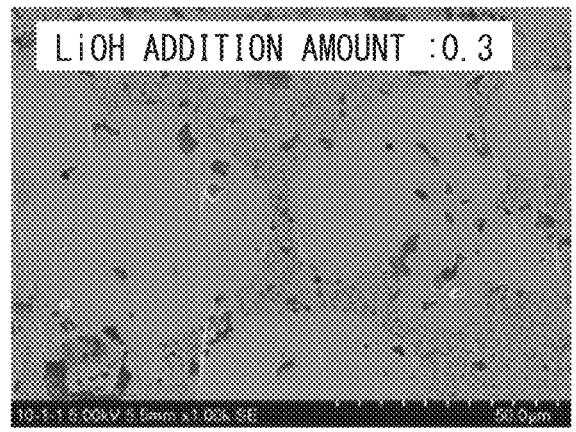
Figure 5D:
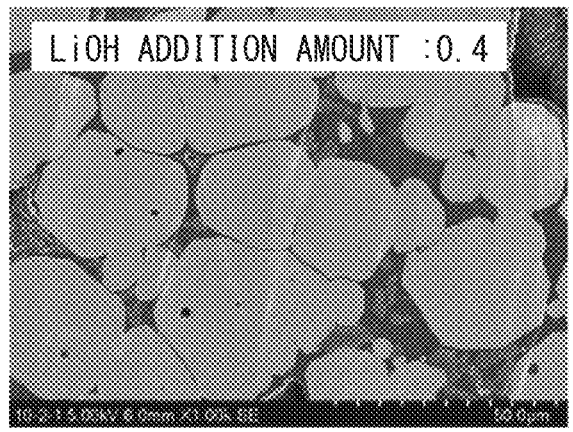
Figure 5E:
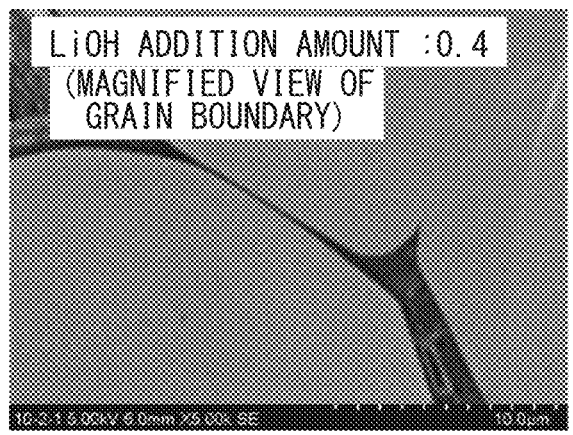

The cross sections of the sintered bodies of Experimental Examples 1 to 6 are observed by SEM. First, the fractured surface of the sintered pellet is polished by an abrasive paper to obtain afresh surface, and then, it is fixed on a sample table with a conductive paste. Thus, a smooth cross section is obtained using a thin film/cross-section sample preparation device (i.e., a cross section polisher, SM-09010 manufactured by JEOL Ltd.). For the SEM observation of this processed product, Hitachi SU3500 (with an acceleration voltage in a range between 5 kV and 15 kV) is used. FIGS. 5A to 5E are SEM photographs of a sintered body obtained by sintering a precursor powder. FIG. 5A is an experimental example 2, FIG. 5B is an experimental example 4, FIG. 5C is an experimental example 5, and FIG. 5D is an experimental example 6. FIG. 5E is an enlarged view of the grain boundary portion of FIG. 5D. As shown in FIGS. 5A to 5E, it is confirmed that, in the case of firing in the air at a temperature of 835° C. for 48 hours, it is confirmed that, when the addition amount of LiOH is large, the sintering process is promoted, the coarsening is performed, and the large grains are grown. Although it is preferable that the sintering process is promoted, the excessive grain growth may cause a decrease in voids, which is not preferable. Thus, it is determined such that the addition amount may be sufficient to have the ration of Lh/Lg smaller than 0.3.

Figure 6:
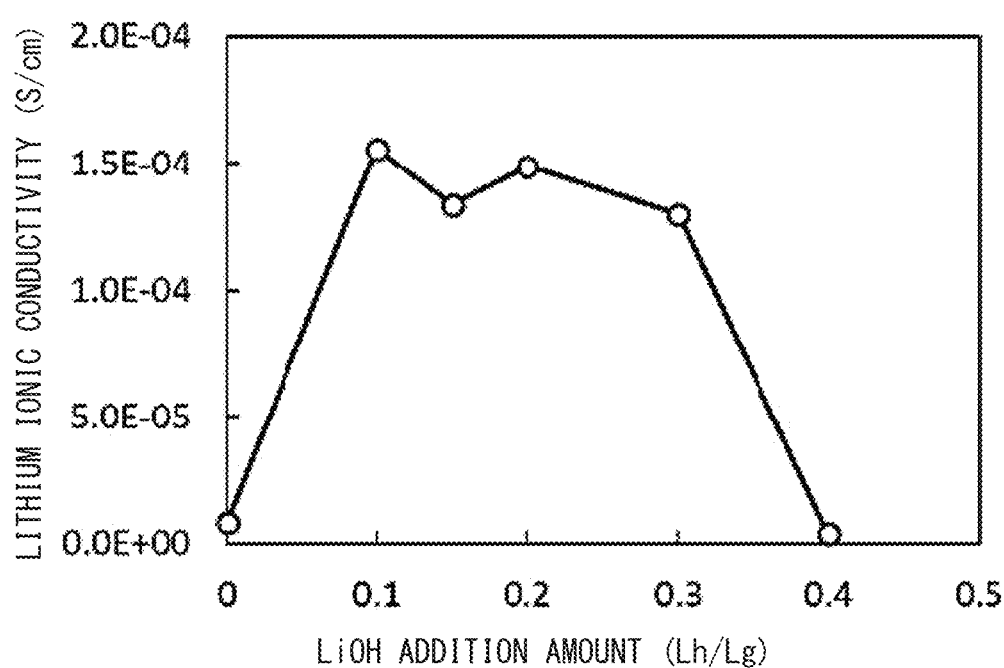
FIG. 6 is a relationship diagram between the additive amount of LiOH and the ionic conductivity of a sintered body.

Next, the optimum range of the addition amount of LiOH is examined from the viewpoint of lithium ion conductivity. The ionic conductivity is measured as follows. The impedance of the sintered body obtained by sintering the precursor powder is measured in the range of 40 Hz to 110 MHz at 100 mV using an AC impedance measuring device (i.e., "4294A" manufactured by Agilent technologies Japan Ltd.) in a constant temperature bath at 25° C. Then, the resistance is obtained from the arc of the Nyquist plot, and the lithium ion conductivity is calculated based on this resistance. FIG. 6 is a relationship diagram between the LOH addition amount with the ration of Lh/Lg and the ionic conductivity (S/cm) of the sintered body of the precursor powder. As shown in FIG. 6, in the sintered bodies of Experimental Example 1 in which the addition amount of LiOH is zero and Experimental example 6 in which the addition amount of LiOH is 0.4, the ionic conductivity show allow value, and the ionic conductivity between 0.05 and 0.35 in the addition amount is stably high and exceeds $1 \times 10^{-4}$ S/cm. When the addition amount of LiOH is 0, the neck growth is insufficient and the sintering process does not proceed, so it is considered that the conductivity is low. Further, when the addition amount of LiOH is 0.4, as shown in FIG. 5E, it is considered that the sintering aid is protruded because the size of the LLZ-CaNb particles are remarkably increased by the coarsening, and the protruded aid penetrates into the grain boundaries, and therefore the conductivity is decreased significantly. From the viewpoint of preventing the coarsening of the base material particles, the addition amount of LiOH is preferably to have the ratio of Lh/Lg in the range of 0.1 or more and less than 0.3. since the generation of voids can be complemented by the addition of the pore-forming material, based on the results of the X-ray diffraction, the structure observation, and the ionic conductivity, it is determined that the addition amount of LiOH is suitable in the range of Lh/Lg of 0.05 or more and 0.35 or less.

[Examination of Sintering Temperature]

Figure 7A:
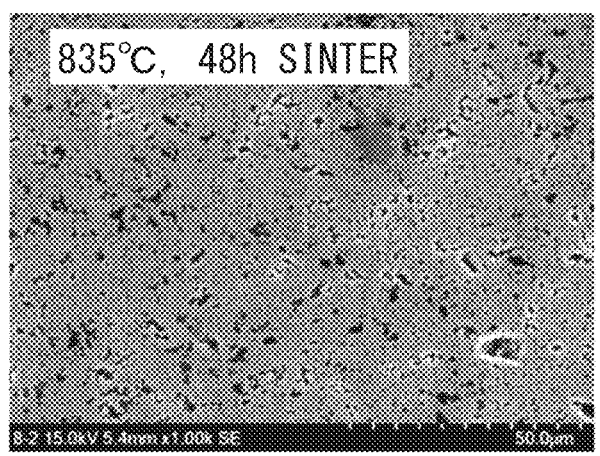
FIGS. 7A and 7B are a result of experiments of a sintering temperature of a sintered body obtained by sintering a precursor powder.
Figure 7B:
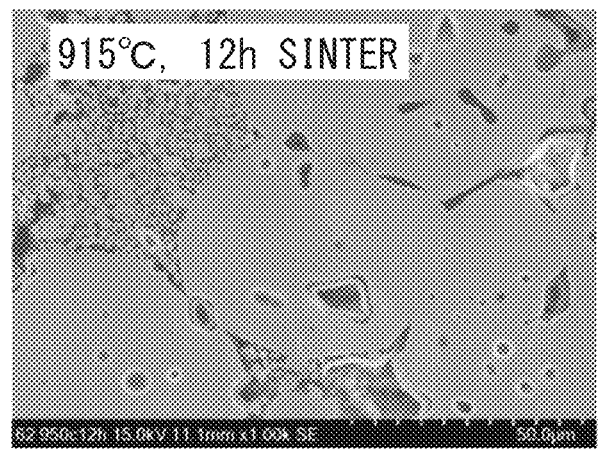

With respect to the precursor powder in which the addition amount of LOH with respect to the ration of Lh/Lg is 0.1, the sintering temperature is changed to prepare a sintered body. The sintering conditions are 835° C. for 48 hours and 915° C. for 12 hours. The cross section of the sintered body is observed by SEM. FIGS. 7A and 7B show the results of examination of the sintering temperature of the sintered body obtained by sintering the precursor powder. FIG. 7A shows the sintered body at 835° C. and FIG. 7B shows the sintered body at 915° C. As shown in FIGS. 7A and 7B, in the sintering process at 915° C., the particles are remarkably coarsened. The sintering process is promoted by raising the temperature, but the crystal grains are also significantly coarsened, which is not suitable for porosity. On the other hand, when the sintering temperature is 835° C., the grain growth is suppressed even when the sintering time is kept as long as 48 hours, and the grain size can be maintained at about 1 to 2 μm even after sintering, which satisfies the condition of the retainment of a grain structure of the good base material. In addition, since the sintering at a temperature of less than 800° C. is insufficient for neck growth and the added $Al_2O_3$ may remain unreacted, the sintering temperature of the precursor powder may be 800° C. or more and 900° C. or less.

[Preparation of LLZ-CaNb Sintered Porous Body]

Figure 8:
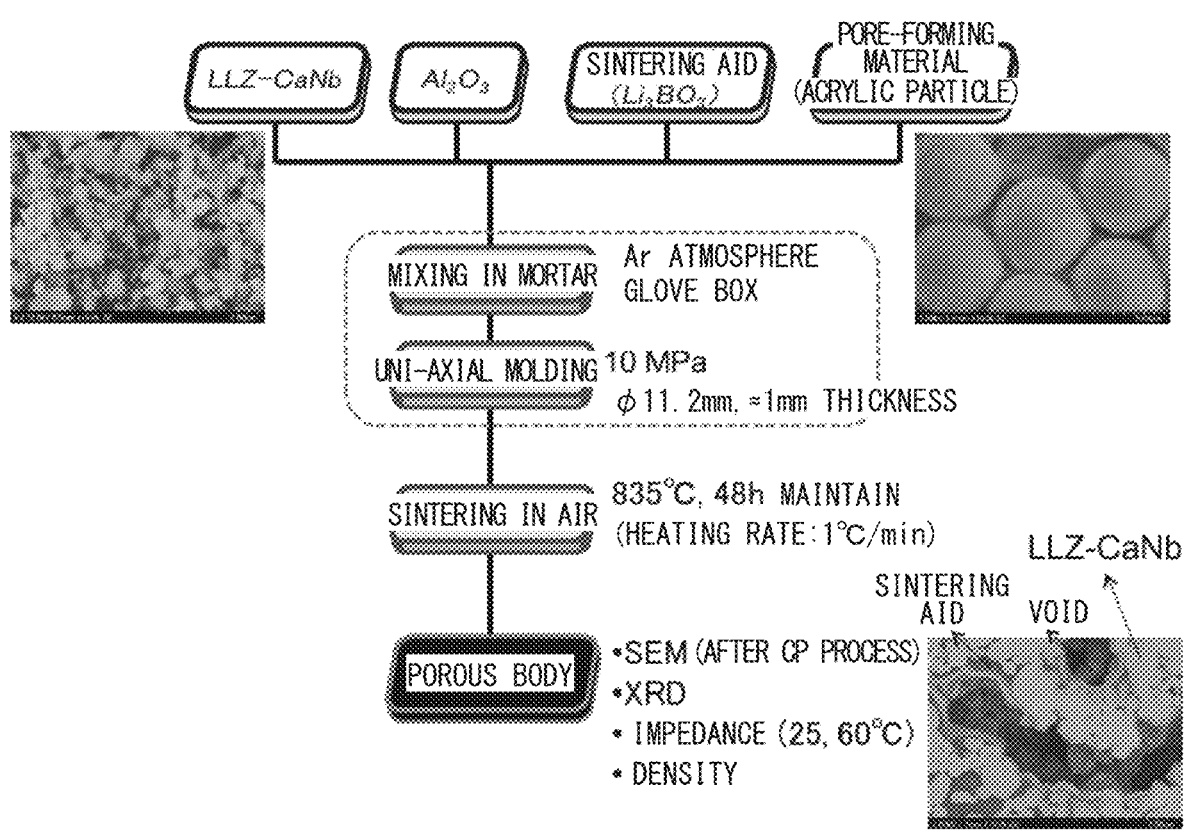
FIG. 8 is a scheme diagram of a manufacturing process of a sintered body using a pore-forming material.

The production of a porous body using LLZ-CaNb powder, whose fine particle conditions after sintering are examined, are studied. A precursor powder having a particle size of 0.5 to 1.0 μm and an acrylic pore-forming material powder having a particle size of 5 μm are used. As the precursor powder, a fine powder made of LLZ-CaNb powder with the LiOH addition amount of the ration Lh/Lg of 0.1 is used. The addition amount of γ-$Al_2O_3$ to 0.1 mol in the base material (made of LLZ-CaNb) is 0.1 mol, and the volume fraction of $Li_3BO_3$ with respect to the total volume of the base material and $Li_3BO_3$ is 10% by volume. The volume ratio of the pore-forming material is 45% by volume, and a porous body is produced by the procedure shown in FIG. 8. FIG. 8 is a scheme diagram of a manufacturing process of a sintered body using a pore-forming material. In this production process, a precursor powder obtained by adding LiOH to LLZ-CaNb fine powder and firing the powder, γ-$Al_2O_3$ and $Li_3BO_3$ as sintering aids, and an acrylic pore-forming material are mixed in the mortar in a glove box in an Ar atmosphere. The mixed powder is uniaxially molded with a diameter of 11.0 mm and a thickness of 1 mm, heated at a temperature rising rate of 1° C./min and held at 835° C. for 48 hours to obtain a sintered porous body of Experimental Example 7. The surface of the obtained sintered porous body is polished and observed by SEM, and X-ray diffraction measurement, impedance measurement (25° C. and 60° C.), and density measurement are performed. The density is obtained by measuring the mass of the sintered body using an electronic balance, the volume is measured using a micrometer, and the density is calculated by dividing the measured mass by the volume.

Figure 9A:
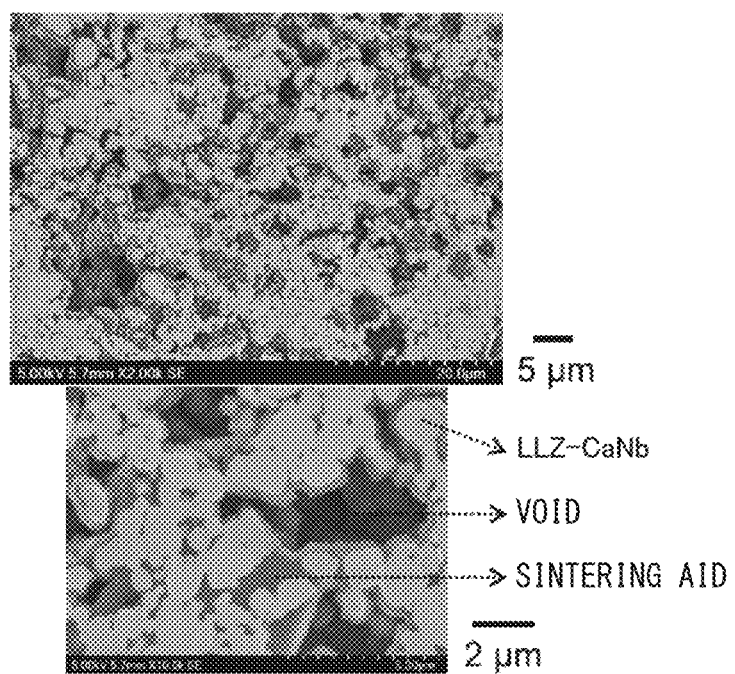
FIGS. 9A and 9B are a result of experiments of the structure and the function of a porous sintered body obtained by sintering a precursor powder.
Figure 9B:
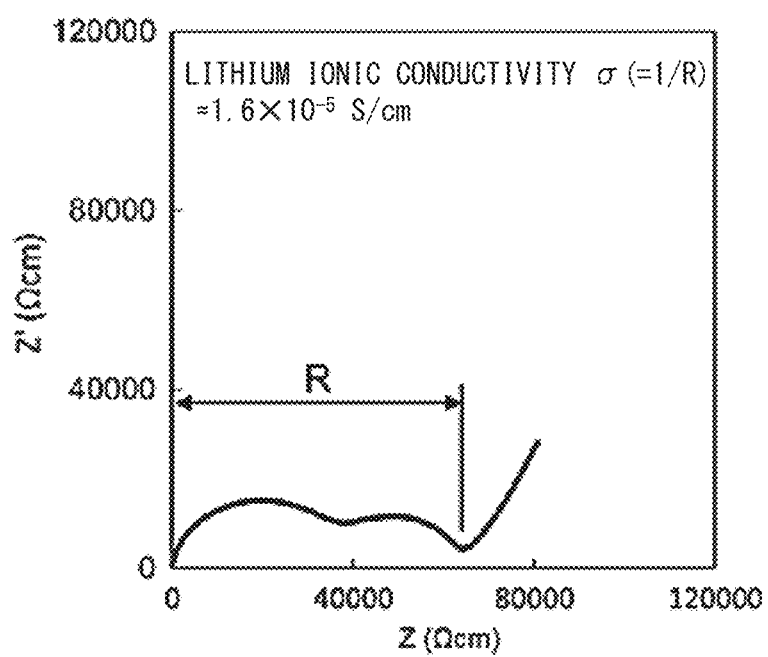

The structure of the obtained porous body is analyzed. Table 1 shows the addition amount of LiOH, the volume fraction, the conductivity, the amount of the pore-forming material, and the like for Experimental Examples 1 to 7. First, the volume fraction of the solid phase is 54% by volume from the density obtained from the outer size and the mass of the sintered pellet. That is, the volume fraction of the voids is 46% by volume, which is close to the preparation composition of the pore-forming material and is equivalent to 2.18 mAh/cm2 in case of converting into a capacity (i.e., lithium stock amount), which is judged to be in a practical range. FIGS. 9A and 9B are a result of experiments of the structure and the function of a porous sintered body obtained by sintering a precursor powder. From the SEM photograph of FIG. 9A, it is confirmed that the particle size of the base material is about 1 to 2 μm, and the fine particle state is retained even after the porous sinterng. Also, from the impedance results of FIG. 9B, it is confirmed that the conductivty in the practical range of about $1 \times 10^{-5}$ S/cm at 25° C. is secured. Further, the ratio of the grain boundary resistance to the inner-grain resistance is equivalent to impedance spectra of Experimental Examples 1 to 6, and it is determined that the main sinternng promoting effect is obtained to the same degree also in the porous body. That is, it is found that, when a precursor powder synthesized by adding LiOH with a predetermined ratio is sintered with a pore-forming material, a porous sintered body having porosity and further suppressing a decrease in conductivity is obtained.

TABLE 1

| EXPERIMENTAL EXAMPLE | ADDITION AMOUNT OF LiOH (mol/mol)[1] | VOLUME FRACTION (%) | | | | LITHIUM ION CONDUCTIVITY (S/cm) | PORE-FORMING MATERIAL (vol. %) |
|---|---|---|---|---|---|---|---|
| | | LLZ[2] | $L_2CO_3$ | $L_3BO_3$ | VOIDS | | |
| No. 1 | 0.00 | 66.4 | 0 | 7.5 | 26.1 | $8.1 \times 10^{-6}$ | 0 |
| No. 2 | 0.10 | 69.7 | 5.1 | 8 | 17.2 | $1.6 \times 10^{-4}$ | 0 |
| No. 3 | 0.15 | 69.2 | 7.6 | 8.1 | 15.1 | $1.3 \times 10^{-4}$ | 0 |
| No. 4 | 0.20 | 69.5 | 10.1 | 8.3 | 12.1 | $1.5 \times 10^{-4}$ | 0 |
| No. 5 | 0.30 | 67.4 | 14.8 | 8.2 | 9.6 | $1.3 \times 10^{-4}$ | 0 |
| No. 6 | 0.40 | 65.3 | 19.1 | 8.2 | 7.4 | $3.7 \times 10^{-4}$ | 0 |
| No. 7 | 0.10 | 47.6 | 3.5 | 5.5 | 43.4 | $1.6 \times 10^{-5}$ | 45 |

[1]Ratio Lh/Lg between the number Lg of Li in LLZ and the number Lh of Li in LiOH($H_2O$)
[2]$Li_{7+x-y}(La_{3-x}, A_x)(Zr_{2-y}, T_y)O_{12}$, A is Ca and T is Nb Here, the method for producing a sintered body and the sintered body of the present disclosure are not limited to the above-described examples, and can be carried out in various modes within the technical scope of the present disclosure.

The present disclosure may be used in the technical field of using a substance that conducts Li ions, for example, the technical field of the battery industry.

Although the present disclosure has been described in accordance with the embodiments, it is understood that the present disclosure is not limited to the embodiments and structures disclosed therein. The present disclosure covers various modification examples and equivalent arrangements. In addition, various combinations and forms, and further, other combinations and forms including only one element, or more or less than these elements are also within the sprit and the scope of the present disclosure.

What is claimed is:

1. A method for manufacturing a sintered body comprising:
   a precursor manufacturing step for synthesizing a precursor powder, which is not sintered, by mixing lithium hydroxide with a base material powder made of a garnet-type oxide having an average particle size in a range of 0.1 μm to 5 μm and including at least Li, La, and Zr and by firing an obtained power; and
   a molding and sintering step for molding the precursor powder as it is, or adding a pore-forming material to the precursor powder and molding, and for sintering an obtained molded body at a temperature of 900° C. or less to obtain a sintered body having a void of 8% by volume or more.

2. The method for manufacturing the sintered body according to claim 1 m, wherein:
   in the precursor manufacturing step, the base material powder having a basic composition of $Li_{7.0+x-y}(La_{3-x}, A_x)(Zr_{2-y}, T_y)O_{12}$ is used;
   A is at least one of Sr and Ca;
   T is at least one of Nb and Ta,
   an equation of 0<x≤1.0 and an equation of 0<y<0.75 are satisfied.

3. The method for manufacturing the sintered body according to claim 1, wherein:
   a lithium number in the lithium hydroxide is defined as Lh;
   a lithium number in the garnet type oxide is defined as Lg;
   a ration of Lh with respect to Lg is defined as Lh/Lg; and
   in the precursor manufacturing step, the lithium hydroxide is mixed in a range of Lh/Lg of 0.05 or more and 0.35 or less.

4. The method for manufacturing the sintered body according to claim 1, wherein:
   in the precursor manufacturing step, a mixed powder is fired at a temperature of 650° C. or higher and 800° C. or lower.

5. The method for manufacturing the sintered body according to claim 1, wherein:
   in the molding and sintering step, lithium borate is further added and molded.

6. The method for manufacturing the sintered body according to claim 1, wherein:
   in the molding and sintering step, the molded body is sintered at a temperature of 800° C. or higher and 900° C. or lower.

7. The method for manufacturing the sintered body according to claim 1, wherein:
   in the molding and sintering step, the pore-forming material is added to the precursor powder to mold and sinter, and the sintered body having the void in a range of 10% by volume or more and 50% by volume or less and having an ion conductivity of $1.0 \times 10^{-4}$ S/cm at 25° C. is obtained.

8. The method for manufacturing the sintered body according to claim 1, wherein:
   in the molding and sintering step, the precursor powder is molded and sintered without adding the pore-forming material, and the sintered body having the void of 20% by volume or less and having an ion conductivity of $1.0 \times 10^{-5}$ S/cm at 25° C. is obtained.

9. The method for manufacturing the sintered body according to claim 1, wherein:
   in the molding and sintering step, the sintered body including aluminum oxide in an amount of 0.08 mol or more and 0.12 mol or less with respect to 1 mol of the garnet-type oxide is obtained.

10. The method for manufacturing the sintered body according to claim 1, wherein:
    an ion conductivity of the sintered body at 25° C. is $1.0 \times 10^{-5}$ S/cm or more.

11. The method for manufacturing the sintered body according to claim 10, wherein:
    the base material particle has a basic composition of $Li_{7.0+x-y}(La_{3-x}, A_x)(Zr_{2-y}, T_y)O_{12}$;
    A is at least one of Sr and Ca;
    T is at least one of Nb and Ta; and
    an equation of 0<x≤1.0 and an equation of 0<y<0.75 are satisfied.

12. The method for manufacturing the sintered body according to claim 10, wherein:
   lithium borate is included in a grain boundary of the base material particle.

13. The method for manufacturing the sintered body according to claim 10, wherein
   the void is in a range of 10% by volume or more and 50% by volume or less.

14. The method for manufacturing the sintered body according to claim 10, wherein
   the void is in a range of 20% by volume or less; and
   an ion conductivity of the sintered body at 25° C. is $1.0 \times 10^{-4}$ S/cm or more.

* * * * *